United States Patent [19]

Gerety et al.

[11] Patent Number: 4,821,180
[45] Date of Patent: Apr. 11, 1989

[54] DEVICE INTERFACE CONTROLLER FOR INTERCEPTING COMMUNICATION BETWEEN A MICROCOMPUTER AND PERIPHERAL DEVICES TO CONTROL DATA TRANSFERS

[75] Inventors: Eugene P. Gerety, Wolcott; Jitender K. Vij, Trumbull, both of Conn.

[73] Assignee: ITT Corporation, New York, N.Y.

[21] Appl. No.: 705,456

[22] Filed: Feb. 25, 1985

[51] Int. Cl.⁴ .................... G06F 3/00; G06F 9/22; G06F 13/14; G06F 13/36

[52] U.S. Cl. .................................................. 364/200

[58] Field of Search ... 364/200 MS File, 900 MS File

[56] References Cited

U.S. PATENT DOCUMENTS

| 4,067,059 | 1/1978 | Derchak | 364/200 |
|---|---|---|---|
| 4,137,565 | 1/1979 | Mager et al. | 364/200 |
| 4,197,588 | 4/1980 | Casou et al. | 364/900 |
| 4,215,400 | 7/1980 | Denko | 364/200 |
| 4,224,665 | 9/1980 | de Bijl et al. | 364/200 |
| 4,371,932 | 2/1983 | Dinwiddie, Jr. et al. | 364/200 |
| 4,456,970 | 6/1984 | Catiller et al. | 364/900 |
| 4,458,313 | 7/1984 | Suzuki et al. | 364/200 |
| 4,475,155 | 10/1984 | Oishi et al. | 364/200 |
| 4,482,951 | 11/1984 | Swaney et al. | 364/200 |
| 4,485,438 | 11/1984 | Myrmo et al. | 364/200 |
| 4,538,224 | 8/1985 | Peterson | 364/200 |
| 4,543,629 | 9/1985 | Carey et al. | 364/200 |
| 4,564,900 | 1/1986 | Smitt | 364/200 |

Primary Examiner—Archie E. Williams, Jr.
Assistant Examiner—Danh Phung
Attorney, Agent, or Firm—Walter J. Baum; Robert A. Walsh; Thomas N. Twomey

[57] ABSTRACT

An apparatus for use with a DMA controller includes a device interface controller having therein both general and specific command programs, and device bus interface. The apparatus is arranged to intercept all communication signals between the DMA controller and a microcomputer associated therewith.

6 Claims, 6 Drawing Sheets

DEVICE INTERFACE CONTROLLER FOR INTERCEPTING COMMUNICATION BETWEEN A MICROCOMPUTER AND PERIPHERAL DEVICES TO CONTROL DATA TRANSFERS

CROSS-REFERENCE TO RELATED APPLICATIONS

This application is related to one, or more, of the following U.S. Patent Applications: Ser. No. 670,682, now U.S. Pat. No. 4,644,348; Ser. No. 670,701 now U.S. Pat. No. 4,638,311 both filed on Nov. 13, 1984. Ser. No. 705,457 now U.S. Pat. No. 4,780,813; Ser. No. 705,458; Ser. No. 705,459; Ser. No. 705,460 now U.S. Pat. No. 4,719,617; Ser. No. 705,461 now U.S. Pat. No. 4,677,611; Ser. No. 705,462; Ser. No. 705,463; Ser. No. 705,465 now U.S. Pat. No. 4,792,941, Ser. No. 705,464 now U.S. Pat. No. 4,653,047 all filed on even data herewith. All of the above applications are assigned to the assignee hereof.

BACKGROUND OF THE INVENTION

The present invention generally relates to an apparatus for use with a DMA controller and, in particular, relates to such an apparatus adapted to intercept normal communication between the DMA controller and a microcomputer associated therewith.

Since the advent of data communication, a major task of system designers has been the efficient control of peripherals attached thereto. Historically, this task has been, and remains, difficult, not only because of the variety of peripherals available, e.g., workstations, printers or the like, but also because of the variety of operating data rates and different manufacturer specifications thereof. The task is further complicated by the variety of microprocessing devices available, most being unable to directly exchange information with a peripheral and therefore requiring some form of interface device to allow communication between a peripheral and a microprocessor controlling the flow of data.

One conventional resolution to these difficulties has been to include an interface that contained a set of instructions, i.e. a dedicated program, designed to control a specific peripheral. In addition, a data storage medium, such as a random-access-memory (RAM), was introduced between the microprocessor device and the interface. In operation, the microprocessor device would transfer a bit of information into the storage medium via the local bus thereof. The microprocessor would then transfer this single piece of information to the interface. The peripheral would then be controlled, in accordance with the stored program, to accept the information. The interface, upon completing the bit transfer, would interrogate the storage medium, or simply become idle, to obtain the next information to be transferred. The storage medium would contain instructions that would cause, once the information had been transferred to the interface, the microprocessor to be interrupted, regardless of the task being performed thereby, to request the next information.

This transfer process is clearly extremely slow and inefficient. Thus, present systems generally include expanded registers for the microprocessor to provide larger amounts of information that is then relayed to the peripheral via the interface. The advantage gained by this technique is an increase in the time interval between interrupts from the storage medium to the microprocessor.

Nevertheless, most conventional systems frequently require information to be transferred between the microprocessor and the storage medium along the local bus of the microprocessor. This same local microprocessor bus is also utilized to transfer information between the storage medium and the interface. Consequently, in addition to interrupting the microprocessor for further instructions, the mmicroprocessor is interrupted, i.e., removed from access to the local bus thereof, during the actual transfer of data between the storage medium and the device interface. Consequently, the microprocessor frequently has insufficient access to the local bus thereof to enable it to control more than a single peripheral at any given time. In this arrangement, the interface, having acquired the local bus of the microprocessor, has direct access of the memory portion of the microprocessor. An interface having this characteristic is appropriately referred to as a direct-memory-access (DMA) controller.

One conventional solution to this inefficient arrangement is to provide an additional set of instructions, separate from the microprocessor, for the DMA controller. This approach thus unloads some of the functions ordinarily performed by the microprocessor and hence, improves the overall operating speed of the microprocessor. To date, however, the program of fixed instructions has been stored within the storage medium thereby reducing the memory capacity available to the entire system and increasing traffic therethrough thus limiting access to the bus of the microprocessor. The inherent trade-off of this technique is an increase in time between microprocessor interrupts from the storage medium against the reduction of available memory. However, without such a program, the DMA controller is most commonly limited to accessing blocks of contiguous data within the storage medium, beginning at an address provided thereto by the microprocessor. Consequently, once that block of data is transferred, the microprocessor must refill the block and indicate to the DMA controller what and where the address and count is for that information.

Another major aspect of conventional DMA controller is that specific control instructions are required for each particular peripheral that it is handling. Hence, by providing a program within the storage medium, the specific control instructions for the controlled peripheral can also be stored therein and, thus, remove further work from the microprocessor. Unfortunately, the inclusion of such specific control instructions requires additional portions of the storage medium ordinarily used for storing information to be transferred between the microprocessor and the peripheral. Thus, present controllers and the microprocessors interfacing therewith are quite limited in the number of peripherals that can be handled thereby, by any one or more of four basic detrimental conditions. These detrimental conditions are generally referred to as bus latency, bus occupancy, interrupt latency, and interrupt service time.

The condition of bus latency arises because some devices have critical response requirements. That is, failure to respond to a request therefrom within a critical time period often results in the loss of data. The loss of data occurs because new incoming data overrides the data that was to be transferred, or alternately, results in the transmission of meaningless information because the transmit side of the device attempted to retrieve data that had not yet been provided. These situations are complimentary versions of the same thing and are generally referred to as "data overrun" and "data underrun", respectively. Under heavy input/output loads this condition frequently occurs because the local bus traffic of the microprocessor simple does not permit response to local bus requests within the required critical time periods. The most common solution to the bus latency condition is to provide double buffering and utilize a first-in first-out (FIFO) system in front of the transfer mechanism to relieve the instantaneous requirements of any device accessing that buffer. Consequently, the bus need only respond to the average short term load. However, such a solution becomes expensive and requires large assemblies as well as an increase in the overall power requirements thereof.

The condition of bus occupancy occurs when the data transfer traffic increases such that it requires a significant portion of the bus bandwidth and, as a consequence, the capacity of the microprocessor to compute is diminished. Such a condition subsequently impacts the entire throughput of the system. Traditionally, this condition has been resolved by distributing the data transfer load and control of DMA controllers over more microprocessors and/or introducing faster microprocessors. Both solutions are quite expensive.

Interrupt latency occurs upon completion of the transfer of information by a DMA controller to the controlled peripheral, whereupon an interrupt is generated to request further data, information, or instructions. The time required for the microprocessor to respond to such an interrupt request may be critical for any one of several reasons. Perhaps the most important of these reasons is that the failure to respond to such an interrupt can cause the microprocessor to fail to recognize any subsquent interrupts from the same source that occurs before the pending interrupt is acknowledged. Although it is possible for modern devices to respond rapidly to interrupts, a heavy interrupt load on any microprocessor causes delays in responding to subsequent interrupts, i.e., simply overloading the microprocessor results in a backup of interrupts awaiting service while others are being serviced.

The condition of interrupt latency is compounded by the condition of interrupt service times. The interrupt service time, i.e., minimally about one millisecond, stems from the simple fact that once an interrupt request has been responded to by the mciroprocessor, the request per se, must still be serviced. A typical condition is that a device designed for receiving data, must first be initialized, i.e., put in a ready condition, before the first piece of data is transferred thereto. Failure to do this can cause both data overruns and data underruns in the same way as bus latency. Further, initialization requires the transfer of commands and controls to instruct the device where to store the incoming data and ascertaining that it is now eligible to receive data. In addition, error checking, to ensure that previous transmissions have been correctly sent, must also be performed prior to initialization to ensure that initialization does not result in a data overrun. Finally, the microprocessor, in order to execute its program and process data, must have access to the local bus thereof to effect that processing of data, that is, the microprocessor must access the bus at least as long as it takes to complete the required processing. This frequently results in difficulties because present DMA controllers require considerable servicing by the microprocessor associated therewith in order to effectively service all of the innterrupts and avoid some of the problems stated above. Consequently, the real task, i.e. computational tasks, of the microprocessor is slowed and becomes effectively bound by the DMA controller.

Techniques are, however, becoming known and available to replace present DMA controllers and thus alleviate some of the above-discussed difficulties. Nevertheless, the difficulties will remain for at least the foreseeable future since many peripherals presently include DMA controllers as an integral part thereof. From a system viewpoint these peripheral DMA controllers are the "devices" for which a microcomputer interface must be designed.

SUMMARY OF THE INVENTION

Accordingly it is one object of the present invention to provide an apparatus for use with a DMA controller that substantially completely overcomes the above-recited difficulties.

This object is accomplished, at least in part, by an apparatus having means for intercepting normal communications between a DMA controller and the microcomputer associated therewith.

Other objects and advantages will become apparent to those skilled in the art from the following detailed description read in conjunction with the appended claims and the drawings attached hereto.

DETAILED DESCRIPTION OF THE INVENTION

Figure 1:
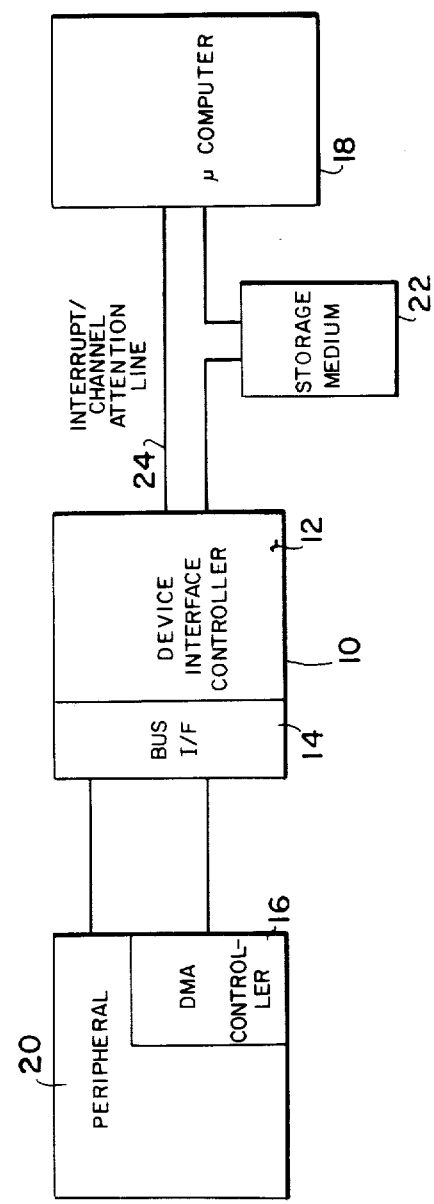
FIG. 1 is a block diagram of an appartus embodying the principles of the present invention, in a typical operating environment thereof.

An apparatus, generally indicated at 10 in FIG. 1 and embodying the principles of the present invention, includes a device interface controller 12 and a device bus interface 14. As shown, the apparatus 10 is arranged such that conventional signalling between a DMA controller 16 and an associated microcomputer 18 is intercepted thereby. The DMA controller 16 is, effectively, an integral part of a peripheral 20 and, although not necessarily within the peripheral 20, per se, is, nevertheless, such that it cannot be reasonably replaced or circumvented. The microcomputer 18 can be associated with any system having the peripheral 20, and the associated DMA controller 16, as, for example, a controlled adjunct thereto. Although only one DMA controller 16 is shown it will be understood that a plurality of such DMA controllers 16 may be serviced by the same apparatus 10 and microcomputer 18.

As shown in FIG. 1, in one arrangement, the device interface controller 12 and the microcomputer 18 are provided with a storage medium 22. Preferably, the storage medium 22 is, effectively, equally and independently accessible to the device interface controller 12 and the microcompmuter 18. In this configuration, the only direct communication between the device interface controller 12 and the microcomputer 18 is via a set of interrupt/channel attention lines 24. As a result, from this arrangement alone, a considerable amount of the interrupt service load is removed from the microcomputer 18 since the level bus thereof is not directly substantially involved in the transfer of address and data information during a transfer between the device interface controller 12 and the storage medium 22. One apparatus particularly adapted for such a configuration is described and discussed in U.S. patent application Ser. No. 705,457 entitled "Data Transport Control Apparatus" now U.S. Pat. No. 4,780,813, filed on even date herewith and assigned to the assignee hereof. This application is deemed incorporated herein by reference.

Figure 2:
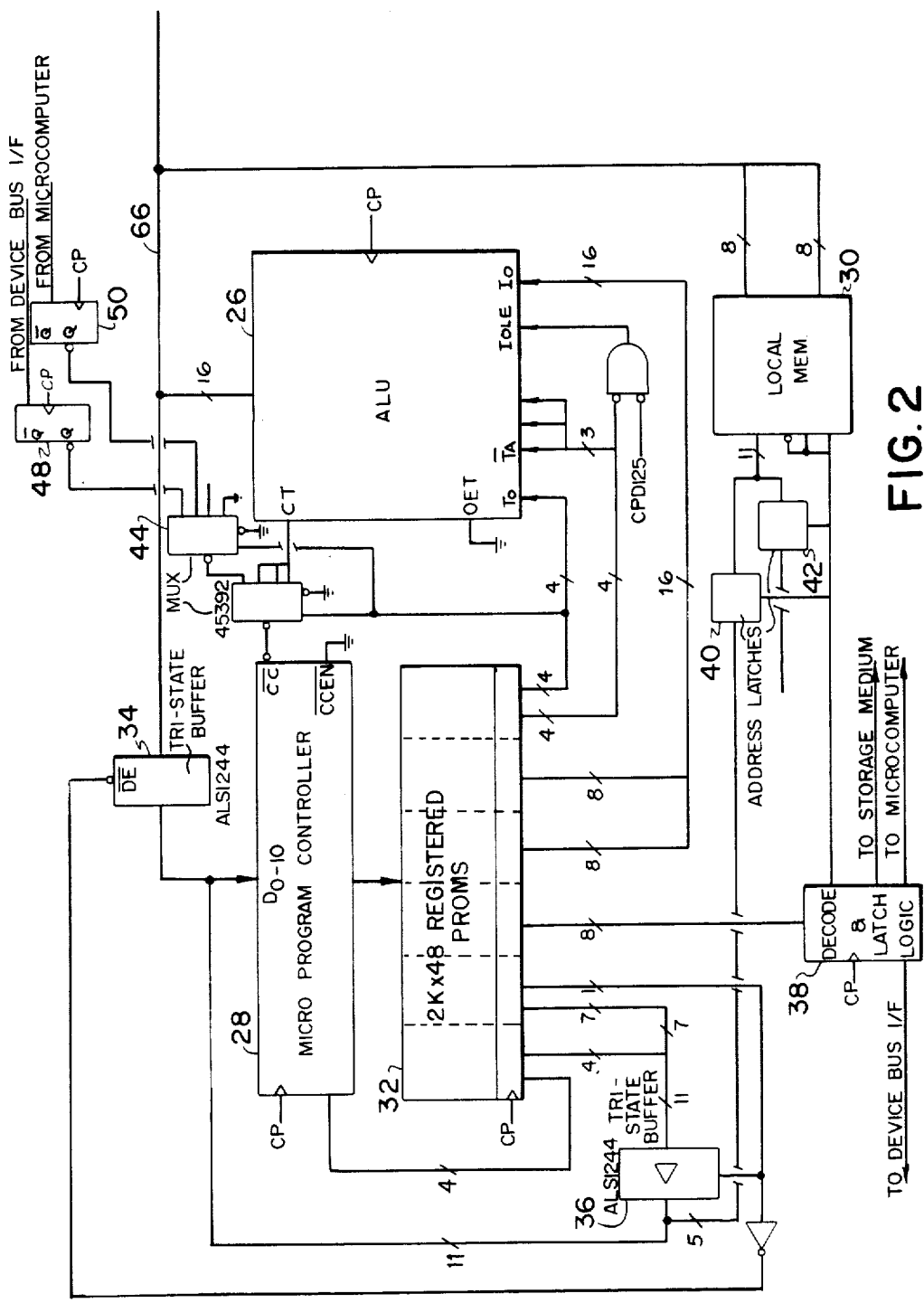
FIG. 2 is a detailed block diagram of the device interface controller shown in FIG. 1.

The device interface controller 12, as more fully discussed below in reference to FIG. 2, includes means for storing a general instruction program for controlling the DMA controller 16 interfaced thereto and means for storing a set of specific instruction programs for providing the commands specific to the various DMA controllers 16 interfaced thereto. For the purpose of the present description the device interface controller 12 is considered to be substantailly identical to that device interface controller described and discussed in U.S. patent application Ser. No. 705,458 entitled "Device Interface Controller" filed on even date herewith and assigned to the assignee hereof. This application is deemed incorporated herein by reference.

As discussed in the above-referenced U.S. patent application Ser. No. 705,458 entitled "Device Interface Controller", and as shown in FIG. 2, the device interface controller 12 includes an arithmetic logic unit (ALU) 26, a microprogram controller 28 and a local, or scratch pad, memory 30. The ALU 26, the microprogram controller 28 and the scratch pad memory 30 effectively function as a dedicated microprocessor. In addition, the device interface controller 12 includes a programmable read-only-memory (PROM) bank 32 adapted to store both the general instruction program and the set of DMA controller specific programs. Further, the device interface controller 12 includes first and second tri-state buffers, 34 and 36, respectively, a decode and latch logic unit 38, first and second address latches, 40 and 42, respectively, first and second multiplexers, 44 and 46, respectively, and first and second flip-flops, 48 and 50 respectively.

Figure 3:
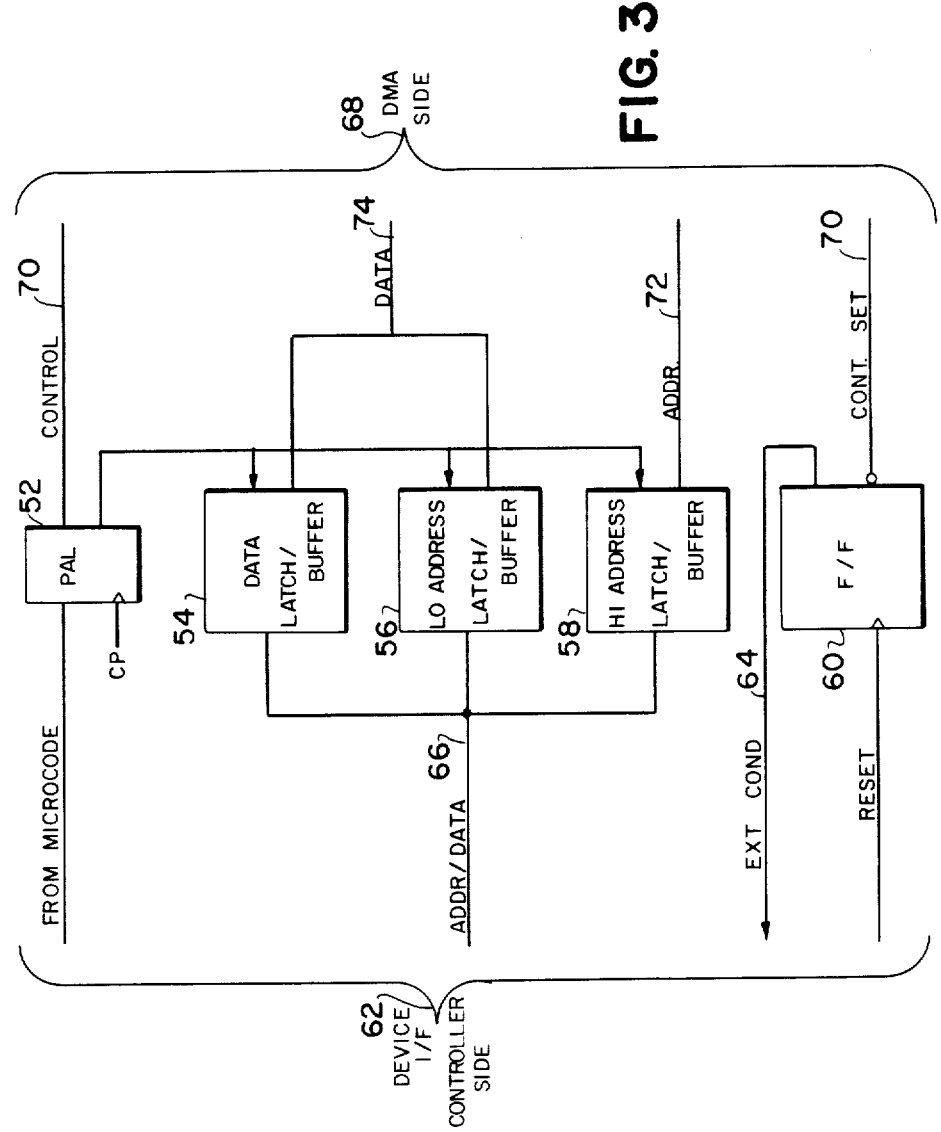
FIG. 3 is a detailed block diagram of the bus interface shown in FIG. 1.

In one embodiment, as shown in FIG. 3, the device has interface 14 of the apparatus 10 includes a programmable array logic (PAL) device 52, a data latch/buffer 54, a LO address latch/buffer 56, a HI address latch/buffer 58 and a flip-flop 60. In one implementation, the PAL 52 is an AMPAL 16R8L, manufactured and marketed by Advanced Micro Devices, of Sunnyvale, Calif. Each of the latch/buffers, 54, 56 and 58 is a 74ALS652 manufactured and marketed by Texas Instruments Corp. of Dallas, Tex. The flip-flop 60 is a conventional device readily available from most industry sources. On the device interface controller side 62 of the device bus interface 14 the PAL 52 and the flip-flop 60 interconnect with the decode and latch logic unit 38. The flip-flop 60 is also connected, via an external condition line 64 thereof, to the first flip-flop 48, of the device interface controller 12. The first flip-flop is polled, i.e. monitored for activity, by the dedicated microprocessor of the device interface controller 12. The latch/buffers, 54, 56 and 58, are connected to the address/data bus 66 of the device interface controller 12.

On the DMA controller side 68 of the device bus interface 14, the PAL 52 and the flip-flop 60 are connected to the control bus 70, the HI address latch/buffer 58 is connected to the address bus 72 and the data latch/buffer 54 and LO address latch/buffer 56 are connected to the data bus 74. As known in the art, a DMA controller 16 usually includes a multiwire bus having a first group of wires dedicated to supporting control signals, a second group of wires dedicated to carrying the HI address signals and a third group of wires dedicated to carrying the LO address information and, multiplexed therewith, the data being transferred. The HI and LO designations relate to the general convention used with DMA controllers. That is the "LO" address is usually an 8 bit address multiplexed with 8 bits of data on the data bus 74 whereas the "HI" address is carried on the address bus 72 throughout the data transfer.

Figure 4:
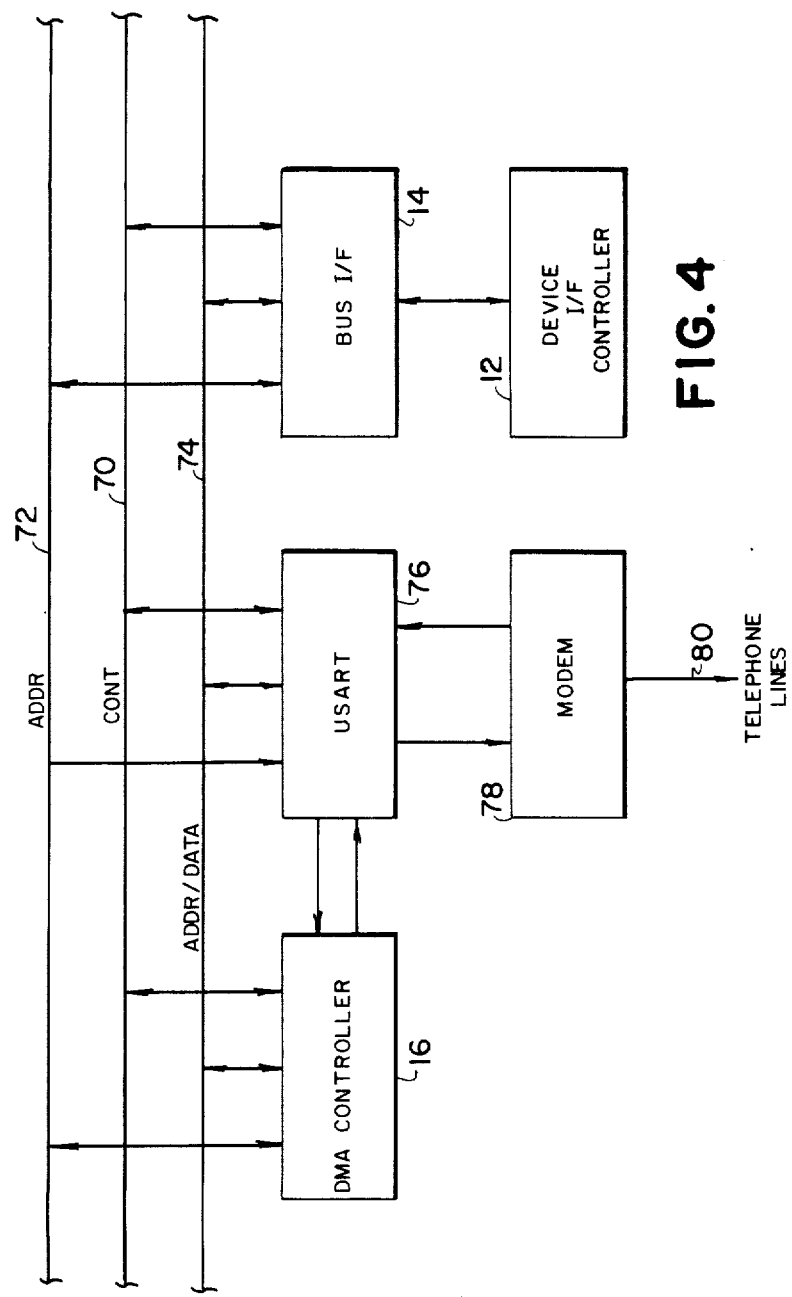
FIG. 4 is a block diagram of an embodiment incorporating the apparatus shown in FIG. 1.

In one operational embodiment, shown in FIG. 4, the DMA controller 16 is adapted to supporting a universal synchronous/asynchronous receiver/ transmitter (USART) 76 that is interfaced with a modem 78 for providing data services to a telephone line 80. In the operational discussion of this embodiment, the DMA controller 16 will be considered to begin to execute a data transfer. For the convenience of the reader, elements in the FIG. 4 previously described herein are designated by the same numerals. Initially, this involves DMA controller 16 presenting the LO portion of the address and data on the multiplexed address/data bus 74 and, simultaneously, presenting the HI address on the address bus 72. Upon detection of this attempt to transfer information the bus interface 14 effects three operations: first,via the PAL 52, the bus interface 14 sends a "not ready" signal to the DMA controller 16 via the control bus 70, thus forcing the DMA controller 16 to maintain its present status; secondly, the bus interface 14 via the flip-flop 60 generates an interrupt signal to the device interface controller 12 to indicate the external condition at the present time; and thirdly, the address is latched in the interface LO address and HI address buffers, 56 and 58 respectively, and the data multiplexed with the LO address is latched in the data buffer 54. It will be understood that the operation and sequencing of the PAL 52 is dependent upon the particular DMA controller 16 to which the bus interface 14 is connected. Such an implementation of a PAL 52 is, once the principles of the present invention are known, considered to be within the skill of one skilled in the art.

As explained in the above referenced U.S. Patent Application Ser. No. 705,457 entitled "Data Transport Control Apparatus", now U.S. Pat. No. 4,780,813, the multiplexers, 44 and 46, detect the change in the external condition at the first flip-flop 48 and assert control over the DMA controller 16 according to the programs stored in the PROM bank 32 via the microprogram controller 28 and the ALU 26. Essentially, the device interface controller 12 examines the address and determines, from the specific programs stored in the PROM bank 32, what is to be done with the data and then signals the DMA controller 16 to complete the transfer. For all intents and purposes, the DMA controller 16 functions as though it were directly interfaced to the microcomputer 18. However, because the device interface controller 12 exerts control over the DMA controller 16 the microcomputer 18 is relieved of the need to respond directly and rapidly to activity of the DMA controller 16. Further, although the apparatus 10 exercises apparent control of the DMA controller 16 it is, nevertheless, actually controlled by the microcomputer 18. Thus, the apparatus 10 is not the controller of the DMA controller 16 although this is not detected by the DMA controller 16.

The configuration shown in FIG. 4 requires relatively little hardware to effectively remove the DMA controller 16 loading of the local bus of the microcomputer 18. However, it does require that the device interface controller 12 respond rapidly to all the transfers of the DMA controller 16 since the data latch/buffer 54 of the bus interface 14 is not sufficiently large enough to store more than a single DMA transfer of a single channel thereof. Thus, to avoid loss of data via a data overrun or a data underrun, the device interface controller 12 is required to process whatever data is necessary to satisfy the DMA controller 16 before a second data transfer on any channel from the DMA controller 16 occurs.

Figure 5:
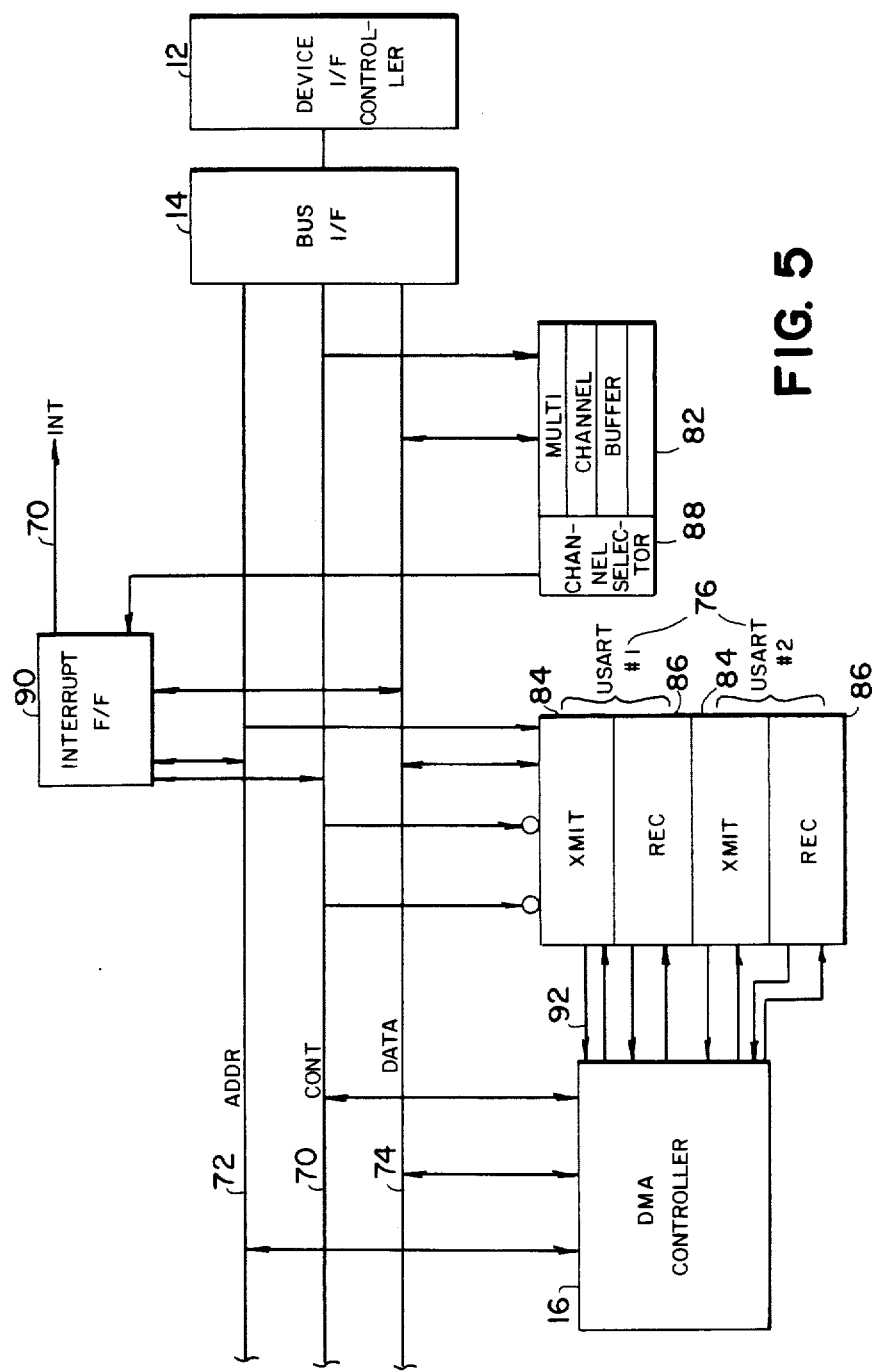
FIG. 5 is a block diagram of another embodiment incorporating the apparatus shown in FIG. 1.

In a second operational environment, a multi-channel buffer 82, is provided between the DMA controller and the device interface controller to alleviate the rapid response requirement from the device interface controller 12. For the convenience of the reader, elements previously described herein are designated by the same numbers in this Figure. As shown in FIG. 5, a DMA controller 16 is adapted to service a pair of USARTs 76 and has bidirectional communication with each transmit and receive portion, 84 and 86, respectively, thereof.

In addition, a channel selector 88 is provided to orderly store the address associated with the data in each of the channels of the multi-channel buffer 82. The channel selector 88 provides a signal to a plurality of interrupt flip-flops 90 that initiates an interrupt signal to the device interface controller 12 when data is entered into any of the channels of the multi-channel buffer 82.

In one preferred implementation, the multi-channel buffer 82 includes a plurality, for example, one per DMA channel, of 74ALS373 data latch/buffers manufactured and marketed by Texas Instruments of Dallas, Tex. One selector 88 particularly adaptable for use with these latch buffers is a 74ALS138 also manufactured and marketed by Texas Instruments of Dallas, Tex. The interrupt flip-flops 90 are readily available throughout the industry.

In operation, the device interface controller 12 generates addresses for the DMA controller 16 that corresponds to one of the channels in the multi-channel buffer 82. Using these addresses the DMA controller 16 actually completes a DMA transfer to the multi-channel buffer 82. Entry of a DMA transfer causes the channel selector 88 to set one of the interrupt flip-flops 90. When any of the interrupt flip-flops 90 are set a signal is generated to the flip-flop 60 of the device bus interface 14. As previously discussed, the flip-flop 60 causes, in response to an external signal due to the DMA transfer, the flip-flop 48 of the device interface controller 12 to change state. The state of this flip-flop 48 being monitored by the dedicated microprocessor of the device interface controller 12. The device interface contorller 12 then interrogates, via the device bus interface 14, the interrupt flip-flops 90 to read the channel, or channels having DMA transfer information therein. The device interface controller 12 then carries out the DMA transfer according to the microprogram in the PROM bank 32 thereof and subsequently provides a new address to the DMA controller 16 for the channel serviced. In addition, the selector 88 is provided with that address so that when that addresses is presented by the DMA controller 16 the selector 88 activates the corresponding data latch/buffer of the multi-channel buffer 82 whereby the DMA transfer data is stored therein.

The primary advantage of this implementation is that a plurality of DMA channels can be serviced simultaneously and the device interface controller 12 need only respond prior to a subsequent DMA transfer on the same DMA channel.

In the event that the DMA controller 16 is adapted to function with DMA transfer acknowledgement signals the channel selector 88 becomes redundant and can be removed. One such DMA controller 16 is the 8257 manufactured and marketed by Intel Corp. of Santa Clara, California. One operational implementation for such a device is shown in FIG. 6.

Figure 6:
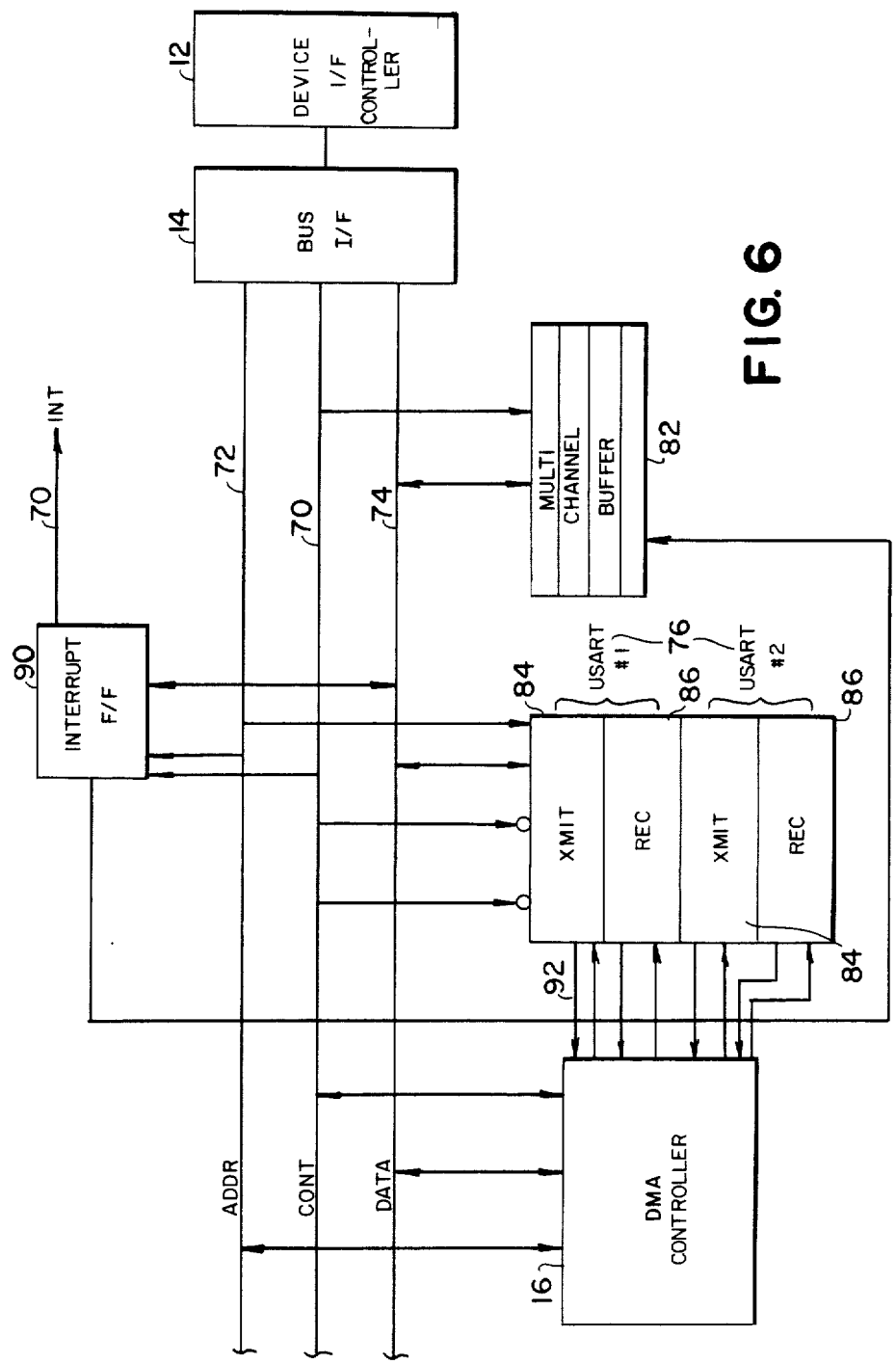
FIG. 6 is a block diagram of a further embodiment incorporating the apparatus shown in FIG. 1.

As shown in FIG. 6 the DMA controller 16 has bidirectional communication with each transmit and receive portion, 84 and 86, respectively, of each USART 76. The signal lines 92 carry DMA transfer acknowledgement signals from the DMA controller 16 to the respective portion, 84 or 86, of each USART 76. The address so provided by the DMA controller 16, in response to a DMA transfer request from the corresponding portion, 84 or 86, of each USART 76, is simultaneously provided to the interrupt flip-flop 90 and the multi-channel buffer 82. This signal thus sets the flip-flop 90 associated with address channel executing the DMA transfer and, simultaneously, activates the corresponding one of the data latch/buffers in the multi-channel buffer 82 to receive the DMA transfer.

The advantage of this implementation is that the device interface controller 12 is relieved of the task of providing and assigning addresses to a channel selector and the DMA controller 16.

The present apparatus 10 is advantageous in that the programs for exerting control are removed from the operating memory of the controlling microprocessor. Thus, the memory available for system use is maximized. Perhaps a more important advantage is that the controlling microcomputer 18 is substantially completely relieved of the interrupt load of the DMA controller. Consequently, the controlling microcomputer is substantially uninhibited in executing the data manipulating tasks assigned thereto. This clearly results in an increase in the system-wide operating speed and data processing.

Although the present invention has been described with regard to an exemplary embodiment, other arrangements and configurations may be developed that are, nevertheless, within the scope and spirit of the present invention. Hence, the present invention is deemed limited only by the appended claims and the reasonable interpretation thereof.

What is claimed:

1. Apparatus for use as an interface between a host microcomputer having input/output means and at least one peripheral device which is operated to receive data from and transmit data to said input/output means of said host microcomputer, said peripheral device being provided with a DMA controller having a control bus, an address bus, and a data bus and means for controlling the operation of said peripheral device; said apparatus comprising:

a bus interface having interface means which are separately interconnected to the control bus, the address bus and the data bus of the DMA controller;

a device interface controller coupled to said interface means of said bus interface, said device interface controller having means for monitoring data received via said bus interface and means for storing a general instruction program for controlling said DMA controller, said device interface controller being operative to examine the data received from said DMA controller via said bus interface and to control said DMA controller by means of said general instruction program based upon the examination of the data received therefrom;

data storage means directly coupled between said host microcomputer and said device interface controller for temporarily storing data transmitted between said host microcomputer and said peripheral device;

an interrupt signaling line coupled between said host microcomputer and said device interface controller for providing an interrupt signal to said host microcomputer to transmit and receive data to and from said data storage means, respectively;

wherein said host microcomputer communicates with said device interface controller only via interrupt signals provided on said interrupt signaling line for the transmitting and receiving of data to and from said peripheral device, whereby said microcomputer is less frequently required to respond to teh operation of said DMA controller of said peripheral device due to the interposed control of said DMA controller by said device interface controller.

2. Apparatus as claimed in claim 1:
wherein said DMA controller having a plurality of channels coupled to said device interface controller via said bus interface, and means for selecting one of said channels to couple to said device interface controller.

3. Apparatus as claimed in claim 1:
wherein said DMA controller having means for indicating to said device interface controller which of said channels has data to be transmitted to or received from said data storage means.

4. Apparatus as claimed in claim 1 wherein said bus interface further comprises:
a data buffer;
an addresss buffer; and
means for indicating, to said bus interface, the condition of data form said DMA controller.

5. Apparatus as claimed in claim 1 wherein said device interface controller includes:
a dedicated microprocessor;
means for storing a program to command and control said DMA controller, said means being accessed by said dedicated microprocessor for servicing said DMA controller.

6. Apparatus as claimed in claim 5 wherein said device interface controller further includes:
a multiplexed address/data bus; said multiplexed address/data bus interconnecting said dedicated microprocessor of said device interface controller and said bus interface.

* * * * *